US010985393B2

(12) United States Patent
Nguyen et al.

(10) Patent No.: US 10,985,393 B2
(45) Date of Patent: Apr. 20, 2021

(54) METHODS FOR FORMING MEMBRANE ELECTRODE ASSEMBLIES

(71) Applicant: University of Kansas, Lawrence, KS (US)

(72) Inventors: Trung Van Nguyen, Lawrence, KS (US); Regis P. Dowd, Jr., Lone Jack, MO (US)

(73) Assignee: UNIVERSITY OF KANSAS, Lawrence, KS (US)

( * ) Notice: Subject to any disclaimer, the term of this patent is extended or adjusted under 35 U.S.C. 154(b) by 105 days.

(21) Appl. No.: 16/040,857

(22) Filed: Jul. 20, 2018

(65) Prior Publication Data
US 2019/0044168 A1 Feb. 7, 2019

Related U.S. Application Data

(60) Provisional application No. 62/541,420, filed on Aug. 4, 2017.

(51) Int. Cl.
*H01M 8/1004* (2016.01)
*H01M 8/0258* (2016.01)
(Continued)

(52) U.S. Cl.
CPC ....... *H01M 8/1004* (2013.01); *H01M 4/8605* (2013.01); *H01M 4/9008* (2013.01); *H01M 8/0258* (2013.01); *H01M 2008/1095* (2013.01)

(58) Field of Classification Search
CPC ............. H01M 8/1004; H01M 8/0258; H01M 4/8605; H01M 4/9008; H01M 2008/1095
See application file for complete search history.

(56) References Cited

U.S. PATENT DOCUMENTS 6,524,736 B1 * 2/2003 Sompalli .................. C25B 9/10
427/115
2004/0131768 A1 * 7/2004 Xie ........................ H01M 4/881
427/115
(Continued)

FOREIGN PATENT DOCUMENTS

JP     2009193926 A  *  8/2009
KR  20060039576 A  *  5/2006

OTHER PUBLICATIONS

English translation of JP-2009193926-A (Year: 2009).*
(Continued)

*Primary Examiner* — Christopher P Domone
*Assistant Examiner* — Kimberly Wyluda
(74) *Attorney, Agent, or Firm* — Bell & Manning, LLC

(57) ABSTRACT

In embodiments, a method of forming a membrane electrode assembly comprises pressing a stack comprising a cathode, an anode, a proton exchange membrane between the cathode and the anode, and a porous catalyst layer in contact with the proton exchange membrane, the porous catalyst layer comprising an ionomer, the ionomer coating internal surfaces of pores of the porous catalyst layer, thereby providing internal ionomer-gas interfaces within the porous catalyst layer; for a time, a pressure, and a temperature to bind the ionomer to the proton exchange membrane, whereby steam is generated within the porous catalyst layer. The steam is removed via pores of the porous catalyst layer to increase the hydrophobicity of the internal ionomer-gas interfaces within the porous catalyst layer.

13 Claims, 13 Drawing Sheets

(51) Int. Cl.
 H01M 4/90 (2006.01)
 H01M 4/86 (2006.01)
 H01M 8/1018 (2016.01)

(56) References Cited

U.S. PATENT DOCUMENTS

2006/0286436 A1* 12/2006 Faghri ................ H01M 4/8817
 429/465
2007/0190400 A1* 8/2007 Buche ................ H01M 4/926
 429/483

OTHER PUBLICATIONS

EPO machine generated English translation of KR-20060039576-A (Year: 2006).*

Dowd et al., Engineering the Ionic Polymer Phase Surface Properties of a PEM Fuel Cell Catalyst Layer, poster given at Gordon Research Seminar on Fuel Cells, Stonehill College, Easton, MA, Aug. 7, 2016.
R. Dowd, Engineering the Ionomer-Gas Interface in a Fuel Cell Catalyst Layer, presentation given at The University of Kansas, Lawrence, KS, Oct. 14, 2016.
Dowd et al., Engineering the Ionic Polymer Phase Surface Properties of a PEM Fuel Cell Catalyst Layer, Journal of the Electrochemical Society, 164 (2), Dec. 31, 2016, pp. F138-F146.
Dowd et al., (Industrial Electrochemistry and Electrochemical Engineering Division Student Achievement Award) Engineering the Ionic Polymer Phase Surface Properties of a PEM Fuel Cell Catalyst Layer, presentation at 229th ECS Meeting, San Diego, CA, USA, Mar. 1, 2016.
Dowd et al., Engineering the Ionic Polymer Phase Surface Properties in a PEM Fuel Cell Catalyst Layer, presentation at 229th ECS Meeting, San Diego, CA, USA, May 31, 2016.

* cited by examiner

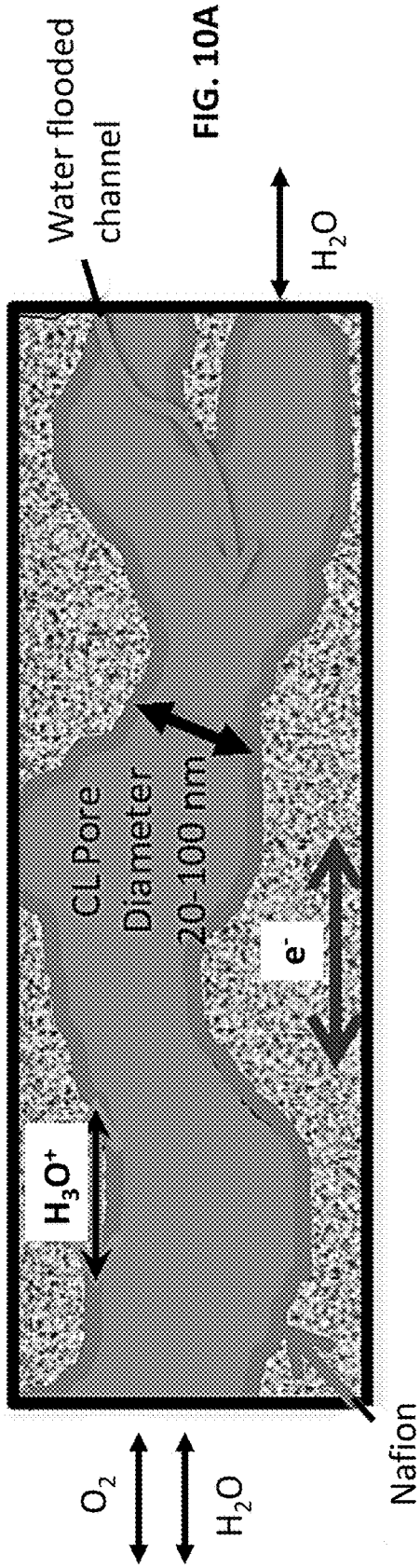
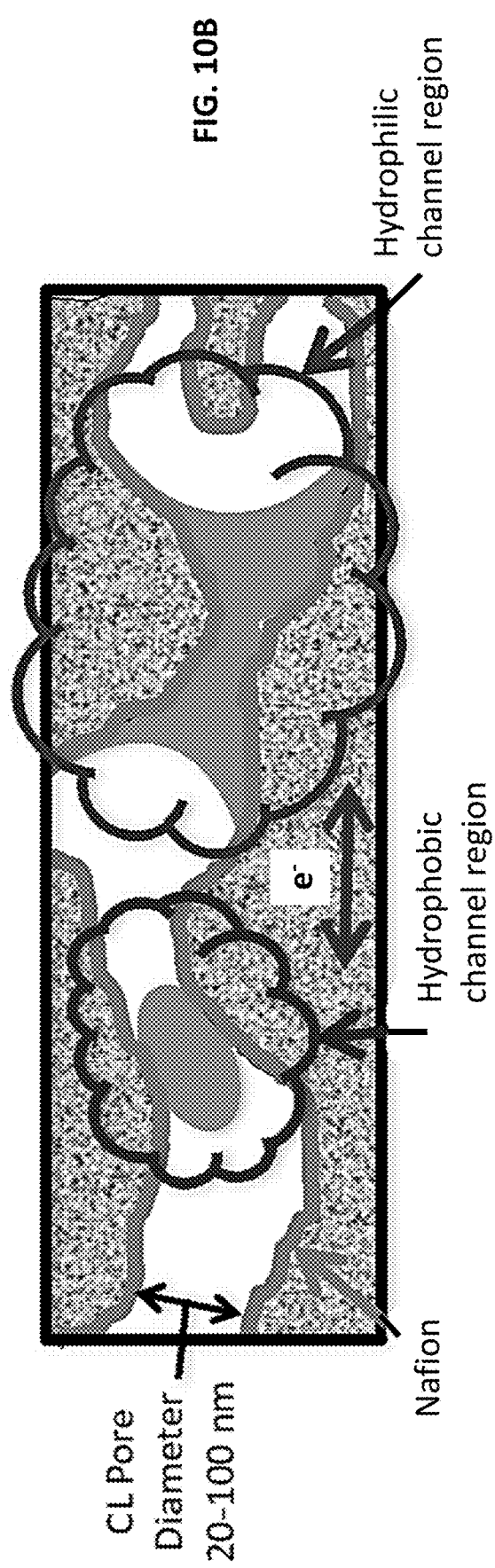
FIG. 10A
FIG. 10B

METHODS FOR FORMING MEMBRANE ELECTRODE ASSEMBLIES

CROSS-REFERENCE TO RELATED APPLICATIONS

The present application claims priority to U.S. Provisional Patent Application No. 62/541,420 that was filed Aug. 4, 2017, the entire contents of which are hereby incorporated by reference.

REFERENCE TO GOVERNMENT RIGHTS

This invention was made with government support under grant numbers CBET-1518755 and EFRI-1038234 awarded by the National Science Foundation. The government has certain rights in the invention.

BACKGROUND

The cathode catalyst layer of a polymer electrolyte membrane fuel cell (PEMFC) exhibits high water saturation levels (i.e. flooding conditions) during high current density operations. Water flooding of the cathode results in reduced fuel cell performance due to lower mass transport rate of oxygen to the catalyst reaction site. Various advances have been developed to overcome water management issues related to PEMFCs. A few of these discoveries include the development of the interdigitated flow field [1], integration of hydrophobic polytetrafluoroethylene (PTFE) nanoparticles into the catalyst layer [2, 3], and gas diffusion layer fabrication from various types of non-wetting materials [4, 5]. Each of these advances led to improved mass transport performance during high current density operations.

SUMMARY

Provided are methods for forming membrane electrode assemblies, the membrane electrode assemblies and polymer electrolyte membrane fuel cells incorporating the membrane electrodes assemblies.

Methods for forming membrane electrode assemblies are provided. In an embodiment, such a method comprises pressing a stack comprising a cathode, an anode, a proton exchange membrane between the cathode and the anode, and a porous catalyst layer in contact with the proton exchange membrane, the porous catalyst layer comprising an ionomer, the ionomer coating internal surfaces of pores of the porous catalyst layer, thereby providing internal ionomer-gas interfaces within the porous catalyst layer; for a time, a pressure, and a temperature to bind the ionomer to the proton exchange membrane, whereby steam is generated within the porous catalyst layer. The steam is removed via pores of the porous catalyst layer to increase the hydrophobicity of the internal ionomer-gas interfaces within the porous catalyst layer.

Polymer electrolyte membrane fuel cells are also provided. In embodiments, such a cell comprises a membrane electrode assembly comprising a cathode, an anode, a proton exchange membrane between the cathode and the anode, and a porous catalyst layer in contact with the proton exchange membrane, the porous catalyst layer comprising an ionomer comprising a sulfonated tetrafluoroethylene based fluoropolymer-copolymer comprising sulfonate ionic groups, the ionomer coating internal surfaces of pores of the porous catalyst layer, thereby providing internal ionomer-gas interfaces within the porous catalyst layer, wherein the internal ionomer-gas interfaces are characterized by a sulfur-to-fluorine atomic percent ratio of no greater than 0.9. The cell further comprises a first flow field in fluid communication with the cathode configured to deliver oxygen to the cathode, and a second flow field in fluid communication with the anode configured to deliver hydrogen to the anode.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIGS. 10A-10B show a schematic of a cross-sectional side view of (FIG. 10A) water-flooded catalyst layer (CL) channel and (FIG. 10B) engineered CL polymer surface.

DETAILED DESCRIPTION

Figure 11:
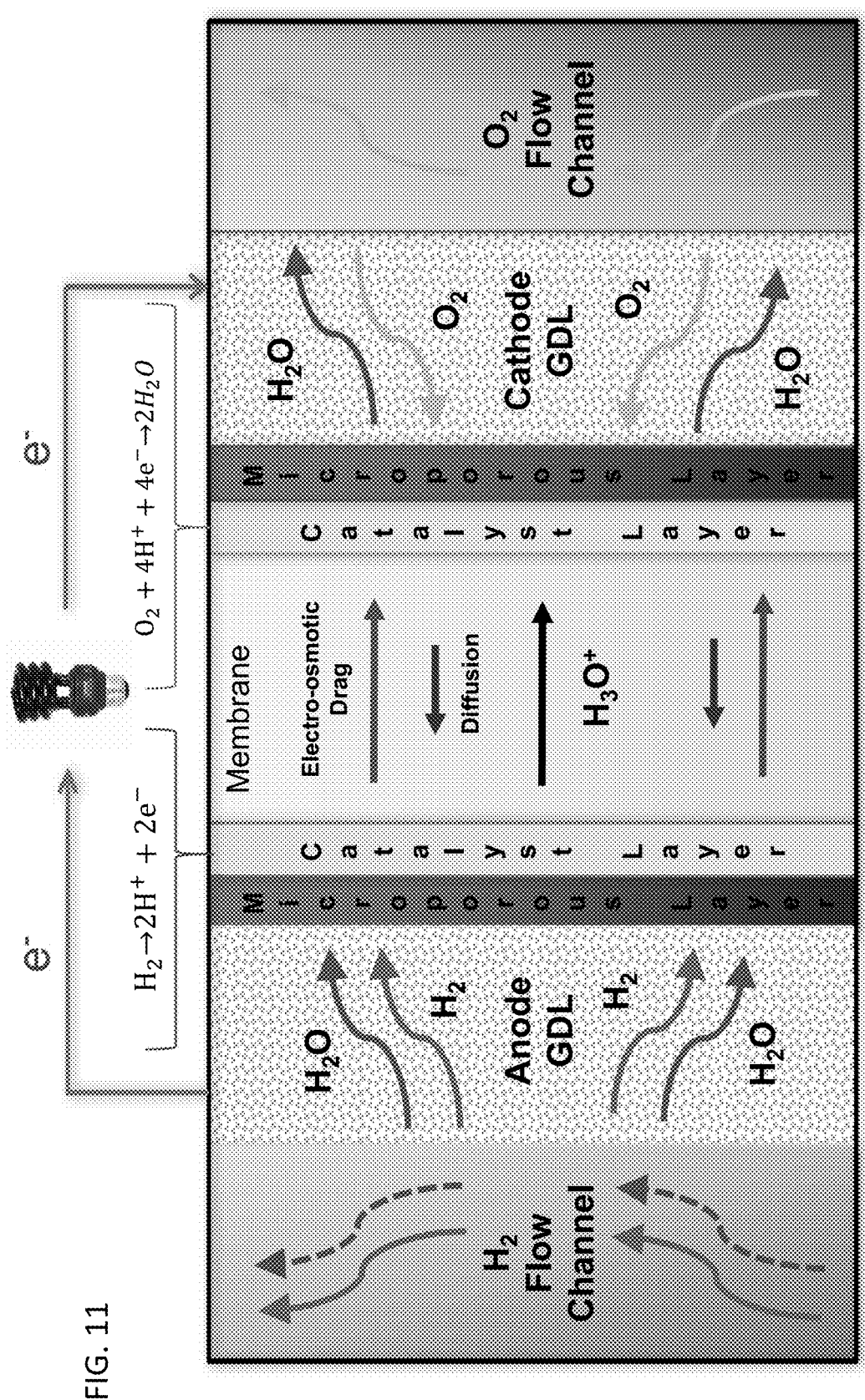
FIG. 11 shows a schematic illustration of a polymer electrolyte membrane fuel cell.

Provided are methods for forming a membrane electrode assembly. The resulting membrane electrode assembly comprises a porous catalyst layer having hydrophobic internal surfaces, thereby providing hydrophobic ionomer-gas interfaces within the porous catalyst layer. Such a membrane electrode assembly may be used in polymer electrolyte fuel cells for enhanced performance. A schematic illustration of a polymer electrolyte fuel cell is shown in FIG. 11. Also provided are the membrane electrode assemblies and polymer electrolyte membrane fuel cells incorporating the membrane electrodes assemblies.

In an embodiment, a method of forming a membrane electrode assembly comprises pressing a stack comprising a cathode, an anode, a proton exchange membrane between the cathode and the anode, and a porous catalyst layer in contact with the proton exchange membrane for a time, a pressure, and a temperature. The porous catalyst layer comprises an ionomer. The time, pressure and temperature are selected to bind the ionomer to the proton exchange membrane. This step generates steam in the porous catalyst layer. The method further comprises removing the steam from the porous catalyst layer to form hydrophobic ionomer-gas interfaces within the porous catalyst layer.

The stack of material layers for forming the membrane electrode assembly may include those configured for use in polymer electrolyte membrane fuel cells. Similarly, the composition of the material layers is generally not limited provided they are appropriate for use in a polymer electrolyte membrane fuel cell. By way of illustration, the cathode may be a multi-layer structure comprising a gas diffusion layer (GDL) comprising an electrically conductive material (e.g., carbon) and a microporous layer (MPL) arranged adjacent to the GDL. A variety of gas diffusion and microporous layers may be used; e.g., commercially available Sigracet 25 BC, non-woven carbon paper having a microporous layer that has been treated with polytetrafluoroethylene to 5%.

A variety of porous catalyst layers may be used. The porous catalyst layer may comprise a catalyst (e.g., Pt), an electrically conductive material (e.g., carbon) and an ionically conductive material (e.g., the ionomer). A suitable ionomer is a sulfonated tetrafluoroethylene based fluoropolymer-copolymer, which is commercially available as Nafion. As manufactured, Nafion's sulfonate ionic groups, which have a high affinity for water, are randomly oriented along the hydrophobic polymeric backbone. Other suitable sulfonated tetrafluoroethylene based fluoropolymer-copolymer ionomers are commercially available as Aquivion. FIG. 10A shows a schematic of a porous catalyst layer, illustrating the porous nature of the layer and the ionomer coating the internal surfaces of the porous catalyst layer, providing ionomer-gas interfaces buried within the porous catalyst layer. The term "buried" refers to internal surfaces within the porous catalyst layer as opposed to the external upper and lower surfaces of the porous catalyst layer. FIG. 10B also shows the effect of a hydrophobic internal surface (left) versus a hydrophilic internal surface (right) on water in the pores of the porous catalyst layer. These figures also show that, unlike a membrane formed entirely of the ionomer, the porous catalyst layer is a significantly more physically and chemically complex entity due to the addition of the catalyst and electrically conductive materials as well as the tortuous, nanoscale pores extending in three dimensions throughout the porous catalyst layer. These pores provide a complex network of internal ionomer-gas interfaces.

A variety of proton exchange membranes may be used. The anode may be configured similarly to the cathode, i.e., as a multi-layer structure comprising a gas diffusion layer and a microporous layer.

The porous catalyst layer is part of the stack of material layers that is pressed to form the membrane electrode assembly. The porous catalyst layer may be introduced to the stack by coating an ink comprising the catalyst, the electrically conductive material and the ionomer noted above onto a surface of the cathode, e.g., on the microporous layer of the cathode. However, the ink may be coated onto a surface of the proton exchange membrane instead. Porous catalyst layers formed using other techniques may also be used. By way of illustration, porous catalyst layers may be formed from an ionomer and a solid catalyst solution which has been extruded using electrospinning. (See Zhang, W. et al., ChemSusChem 2001, 4, 1753-1757, which is hereby incorporated by reference in its entirety.) The resulting porous catalyst layer is in the form of an electrospun mat which may be placed on a surface of the cathode or a surface of the proton exchange membrane.

Another porous catalyst layer may be included between the anode and the proton exchange membrane. This porous catalyst layer may be formed as a coating or an electrospun mat and may be disposed on a surface of the anode or a surface of the proton exchange membrane as described above. However, the amount of catalyst included may differ as compared to the porous catalyst layer between the cathode and the proton exchange membrane.

Figure 2A:
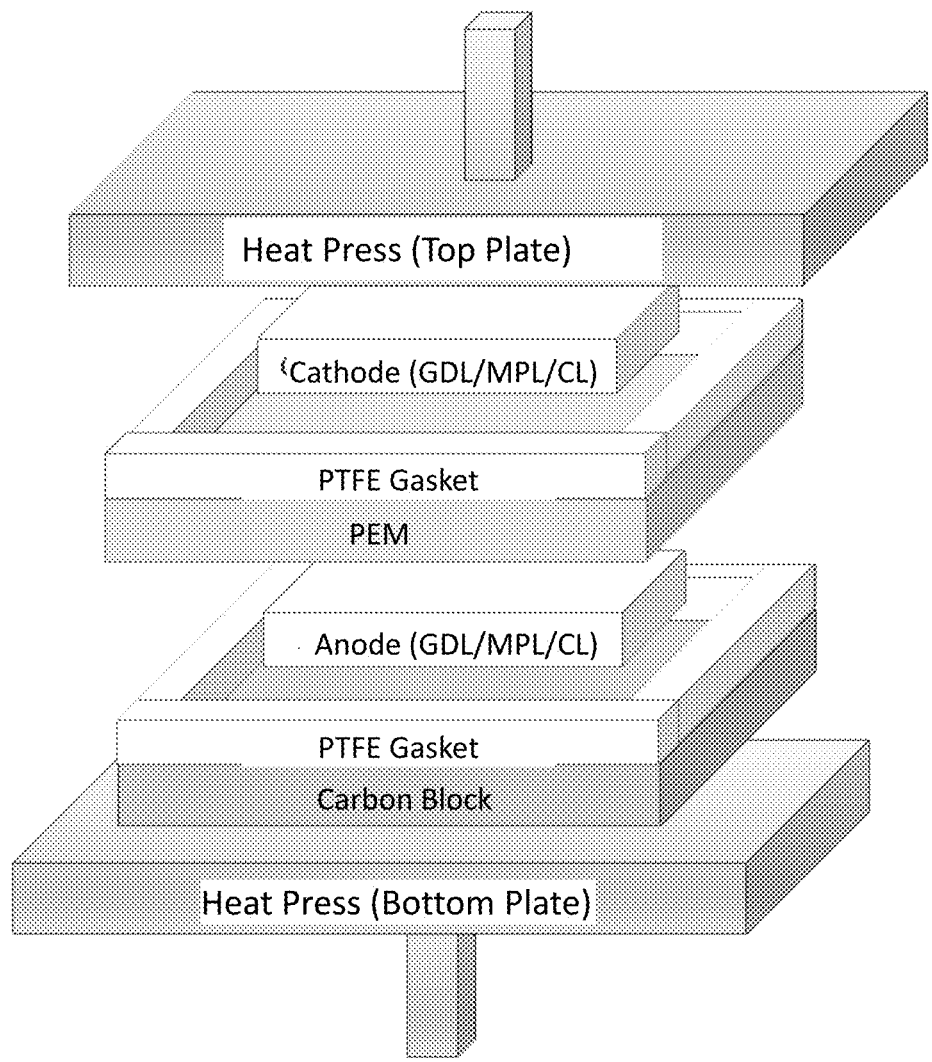
FIGS. 2A-2C illustrate a membrane electrode assembly (MEA) hot-press setup for (FIG. 2A) normal (conventional) MEA and, according to illustrative embodiments, (FIG. 2B) natural convection MEA and (FIG. 2C) forced convection MEA.
Figure 2B:
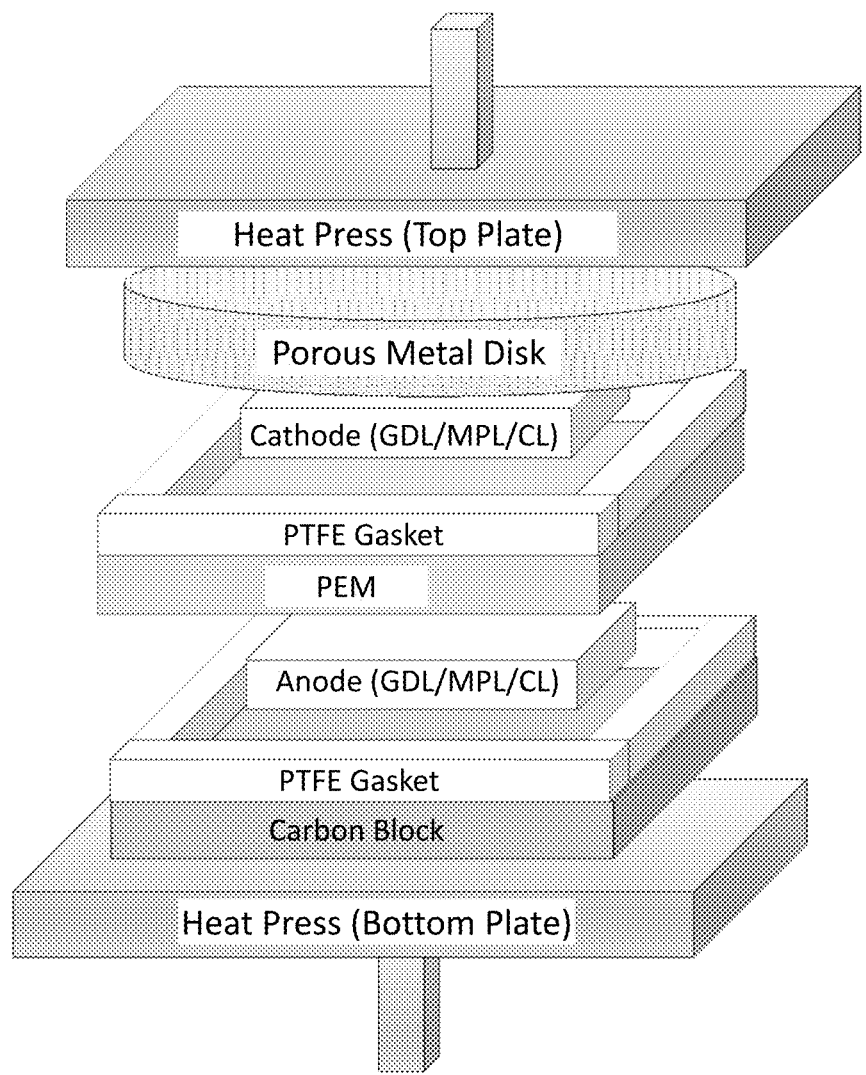
Figure 2C:
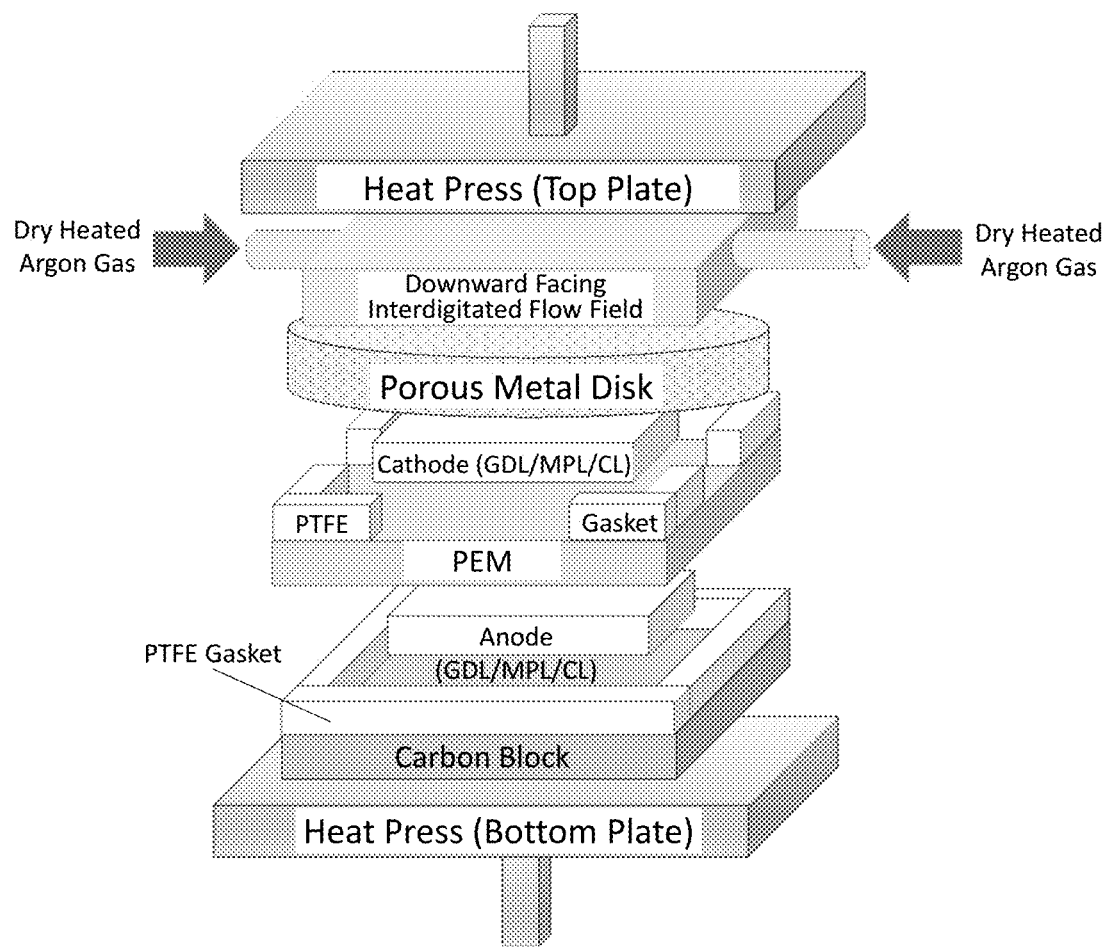

FIGS. 2A-2C illustrate stacks configured for use in polymer electrolyte membrane fuel cells.

In the present method, the stack (of the cathode, the anode, the proton exchange membrane, and the porous catalyst layer) is pressed for a time, a pressure, and a temperature. These parameters are selected to bind the ionomer of the porous catalyst layer to the proton exchange membrane, thereby forming ionic pathways between the catalyst and the proton exchange membrane. Illustrative times include those in the range of from 4 minutes to 6 minutes. Illustrative pressures include those in the range of from 70 psig to 80 psig. The temperature is greater than the glass transition temperature, $T_g$, of the selected ionomer. Such temperatures enable molecular reorganization (i.e., relaxation) of the selected ionomer, including reorientation of its functional groups (e.g., ionic groups such as the sulfonate groups on Nafion) during formation of the membrane electrode assembly. Steam is also generated during the pressing step due to water present in the material layers, e.g., the membrane and porous catalyst layer.

In the present methods, during the pressing step, i.e., during the application of the pressure at the selected temperature for the selected time, this steam is removed from the porous catalyst layer via the pores of the porous catalyst layer. Removal of the steam induces reorientation of the ionic groups of the selected ionomer away from open pores (i.e., away from the ionomer-gas interface) and towards the catalyst/electrically conductive material of the porous catalyst layer. This increases the hydrophobicity of the internal surfaces of the porous catalyst layer. The degree of hydrophobicity may be determined by the relative amount of ionic groups oriented towards the ionomer-gas interface. The degree of hydrophobicity may be measured using X-ray photoelectron spectroscopy (XPS) as described in the Example, below. By way of illustration, for Nafion, the degree of hydrophobicity may be quantified by a sulfur-to-fluorine atomic percent ratio as measured using XPS. (See FIG. 3.) In the present methods, the removal of steam may be adjusted to maximize the degree of hydrophobicity of the ionomer-gas interface of the porous catalyst layer and/or fuel cell performance (further described below). In embodiments, the ionomer is a sulfonated tetrafluoroethylene based fluoropolymer-copolymer (e.g., Nafion) and the sulfur-to-fluorine atomic percent ratio is no greater than 0.9, no greater than 0.8 or no greater than 0.7. These values are percentages, i.e., the sulfur-to-fluorine atomic ratio multiplied by 100. These values may refer to measurements made from within the porous catalyst layer, e.g., by using the layer-by-layer XPS method described in the Example, below, including after a $3^{rd}$ scrape of the porous catalyst layer.

The stack may further comprise a porous plate comprising pores in fluid communication with pores of the porous catalyst layer to facilitate removal of steam from the porous catalyst layer. FIGS. 2B and 2C show an illustrative embodiment of such a porous plate. The porous plate may be configured (e.g., by selection of material, dimensions, porosity, pore shape/dimensions, position within the stack) to maximize hydrophobicity of the porous catalyst layer and/or fuel cell performance. The material of the porous plate is desirably non-corrosive, has high thermal conductivity, resists deformation (e.g., is sufficiently hard) at the selected pressure, and is compatible with temperatures up to about 150° C. The dimensions and porosity/pore characteristics are generally selected to maximize heat transfer and gas flow. Pore size is generally selected to prevent solid materials of the stack from intruding into the pores. An illustrative porous plate is described in the Example, below.

The present methods may further comprise flowing a gas (or mixture of gases) through the pores of the porous catalyst layer during the pressing step. Use of a gas facilitates steam removal by forcing the steam out of the pores of the porous catalyst layer and further reducing the concentration of steam in the pores. The gas may be an inert gas (e.g., argon, helium, nitrogen, etc.); dry, i.e., substantially free of water; and heated, i.e., the temperature of the gas may be greater than room temperature. The temperature of the gas may be the same as the temperature used during the pressing step, i.e., a temperature greater than the glass transition temperature, $T_g$, of the selected ionomer. Illustrative temperatures include at least 135° C., at least 140° C., at least 145° C., etc. The flow rate of the gas may be selected to speed up steam removal without damaging the material layers of the stack.

As noted above, the gas may be flowed during the pressing step. In embodiments, the gas is flowed after the initial application of pressure, e.g., after a predetermined delay period. The predetermined delay period provides an initial, transient steam environment in the pores of the porous catalyst layer. This facilitates relaxation of the ionomer, which in turn, facilitates reorientation of the ionic groups. The predetermined delay period may be selected to maximize hydrophobicity of the porous catalyst layer and/or fuel cell performance. In embodiments, the predetermined delay period is at least 60% of the pressing time. By way of illustration, if the pressing time is 5 minutes, the predetermined delay period (the period of time before gas is flowed) is 3 minutes. In this case, pressing is initiated and continues for 3 minutes, then gas is flowed for the remaining 2 minutes of pressing. In other embodiments, the predetermined delay period is at least 65%, at least 70%, at least 75%, at least 80%, or at least 85% of the pressing time.

Gas may be delivered to the stack via a flow field plate in fluid communication with the pores of the porous catalyst layer, and if present, the pores of the porous plate. The flow field plate may be configured to maximize hydrophobicity of the porous catalyst layer and/or fuel cell performance. A variety of configurations may be used, although the flow field is desirably dead-ended and forces the gas to flow downwardly and uniformly into the pores of the porous catalyst layer/porous plate. In embodiments, the flow field comprises an interdigitated carbon flow field.

If a gasket is included in the stack (e.g., to protect the cathode during pressing, the gasket may be configured (e.g., by forming channels therein) to provide a pathway for the gas to flow out through the cathode during pressing. This is illustrated in FIG. 2C.

The description above refers to the removal of steam from the porous catalyst layer positioned between the cathode and the proton exchange membrane. If another porous catalyst layer is positioned between the anode and the proton exchange membrane, this additional porous catalyst layer can also (but need not) have steam which is generated therein removed during the pressing step. If it is desired to have steam removed during the pressing step, an additional porous plate in fluid communication with the pores of the additional porous catalyst layer may be used, a gas may be flowed through the pores of the additional porous plate, an additional flow field plate in fluid communication with the pores of the additional porous catalyst layer may be used, an additional gasket, or combinations thereof. In such embodiments, the configuration of the additional porous plate as described above, the conditions under which the gas is flowed as described above, the configuration of the additional flow field plate as described above, and the configuration of the additional gasket may be applied. The degree of hydrophobicity of the additional porous catalyst layer may be that as described above. However, the degree of hydrophobicity of the porous catalyst layer between the cathode and the proton exchange membrane and the degree of hydrophobicity of the additional porous catalyst layer between the anode and the proton exchange membrane need not be the same. Also, if steam is not removed from the additional porous catalyst layer during the pressing step, the additional porous catalyst layer will be more hydrophilic (i.e., have a lower degree of hydrophobicity) than the porous catalyst layer between the cathode and the anode.

The present disclosure also provides the membrane electrode assemblies formed by the methods as well as polymer electrolyte membrane fuel cells incorporating the membrane electrode assemblies. In at least some embodiments, the membrane electrode assemblies (and the fuel cells) are characterized by greater hydrophobicities (i.e., porous catalyst layers having highly hydrophobic internal surfaces) and/or enhanced performance as compared to comparative membrane electrode assemblies/fuel cells. By "comparative" it is meant a membrane electrode assembly/fuel cell which is identically configured, identically formed except without removing steam during pressing, and identically tested. The hydrophobicities of the membrane electrode assemblies may be those described above. The fuel cell performance may be quantified by measuring peak power as described in the Example, below. In embodiments, the polymer electrolyte membrane fuel cell is characterized by a peak power density that is at least 40% greater than that of a comparative polymer electrolyte fuel cell. This includes embodiments in which the peak power density is at least 50% greater, at least 75% greater, at least 100% greater, at least 125% greater, at least 135% greater, or at least 150% greater. These values may refer to peak power density measured under certain operating conditions, e.g., at 70° C. with humidified hydrogen/dry air and interdigitated flow fields or at 25° C. with humidified hydrogen/air and interdigitated flow fields. These values may refer to peak power density measured under the hydrogen/air flow rates/pressures described in Table 1, below.

EXAMPLE

Introduction

A PEMFC catalyst layer is comprised of three phases: an electrically conductive phase (electron transport), an ionically conductive phase (ionic transport), and void spaces to allow for gas/liquid flow. Typically, a catalyst ink is prepared by mixing carbon powder decorated with catalyst nanoparticles (i.e. Pt), Nafion ionomer, isopropyl alcohol, and water. [3, 13-15] After thorough mixing of the catalyst ink to ensure a homogenous mixture, the catalyst ink is sprayed onto the microporous layer side of a gas diffusion layer (i.e. SGL25BC). The gas diffusion electrode is then dried to allow the water and isopropyl alcohol to evaporate, thus leaving behind the catalyst layer. Next, the membrane electrode assembly (MEA) is prepared by hot pressing a proton exchange membrane between two gas diffusion electrodes such that both catalyst layers face the membrane. The MEA is then assembled between two flow fields for delivering the reactants to the cathode and anode.

During a conventional MEA fabrication process, electrodes are hot pressed onto each side of the PEM such that the catalyst layer side of the electrodes face the membrane. Prior to hot pressing, gaskets are placed around each electrode to ensure the electrodes are not crushed. Hot pressing is completed at 135° C. and 500 kPa (above ambient pressure) for 5 min. [16] During this process, absorbed water inside the PEM will flash to steam. The steam will diffuse into and saturate the gas pores of the catalyst layer, microporous layer, and gas diffusion layer. The gaskets surrounding each electrode prevents the steam from escaping. Since hot pressing is completed above Nafion's glass transition temperature, the catalyst layer ionomer will bond to the membrane and create a MEA. During the hot-pressing technique, ionic pathways are established between the catalyst reaction site and the membrane which allows ionic conduction from the anode to the cathode during fuel cell operation.

At the onset of MEA hot pressing, a saturated steam environment inside the gas pores of the catalyst layer enables the sulfonate ionic groups of the ionomer phase to relax and, therefore, allow reorientation. This reorientation allows the membrane to bond to the catalyst layer ionomer phase. However, a saturated steam environment during cooling of the MEA below glass transition temperature leads to an increased amount of sulfonate ionic groups oriented towards the ionomer/gas interface (inside the gas pores of the catalyst layer) due to their affinity for water. By contrast, it was determined that a dry gas phase environment during cooling results in a lower number of sulfonate ionic groups oriented towards the ionomer-gas interface. The relative amount of sulfonate ionic groups oriented towards the ionomer/gas interface determines the ionomer's relative hydrophilicity/hydrophobicity. Although the conventional MEA fabrication technique enables the ionomer inside the catalyst layer to form ionic pathways between the catalyst and the membrane, the saturated steam environment inside the gas pores of the catalyst layer during cooling results in a nonhomogeneous ionomer-gas interface (i.e. a mix of hydrophobic and hydrophilic ionomer/gas interfaces). A more ideal and ordered cathode catalyst layer structure was envisioned that would enable improved two-phase flow (i.e. the gas phase occupies the annular region adjacent to the ionomer/gas interface and water occupies the region along the center of the gas pores). In this inverted annular or liquid-ring flow configuration, [17] oxygen gas transported into the catalyst layer has direct access to the ionomer layer without having to first dissolve in the liquid water phase and diffuse through this barrier in order to reach the ionomer phase. A hydrophobic ionomer/gas interface inside the gas pores of the catalyst layer would lead to higher fuel cell performance during high current density operations due to improved mass transport of oxygen into and water removal from the cathode catalyst layer.

This Example demonstrates a MEA fabrication procedure involving natural convection to remove the steam from the ionomer-gas interface inside the catalyst layer prior to cooling. In addition, a thorough analysis is conducted by characterizing the catalyst layer with XPS before and after heat treatment, including the ionomer-gas interface inside the gas pores of the catalyst layer. Additionally, a MEA fabrication technique is demonstrated using forced convection to remove steam from the catalyst layer during hot pressing. Various forced convection duration times are investigated in order to construct a cathode catalyst layer for optimal two-phase flow. In particular, a saturated steam condition at the onset of the MEA fabrication process was found to be important to allow the ionomer phase adequate time to relax. Forced convection (i.e. purging with dry heated inert gas) during the final minutes of the MEA fabrication process removed the saturated steam environment and created a more homogenous hydrophobic ionomer-gas interface. Furthermore, in-depth fuel cell testing was completed to compare the two new MEA fabrication techniques (natural convection and forced convection) with the conventional MEA using various types of flow fields, humidification conditions, and operating temperatures.

Experimental

In order to determine if the ionomer/gas interface inside the gas pores of the catalyst layer could be modified to be hydrophobic or hydrophilic, electrodes were exposed to various heat treatment conditions. Sigracet® GDL-25BC carbon electrodes were selected for this purpose. The microporous layer side (MPL) of the gas diffusion electrodes (GDEs) were coated with a Pt/C/Nafion® layer (0.5 mg/cm$^2$ Pt geometric area, 0.14 mg/cm$^2$ Nafion® ionomer) by TVN Systems Inc. For the hydrophobic case, the GDE was first exposed to a saturated steam environment at a temperature above Nafion's glass transition temperature (GTT). Then, the saturated steam environment was replaced with heated dry argon gas while maintaining the temperature above Nafion's GTT. Finally, the GDE was allowed to slowly cool to room temperature while maintaining the dry argon environment. For the hydrophilic case, the GDE was first exposed to a saturated steam environment similar to the hydrophobic treated case. After a sufficient holding time, the saturated steam environment was maintained as the GDE was slowly cooled to room temperature. More specific details on vessel construction and heat treatment conditions can be found in Reference 16.

A Physical Electronics (PHI) VersaProbe II XPS (Washington University in St. Louis) and VersaProbe III XPS (University of Kansas) were used to capture high resolution scans in order to measure the sulfur and fluorine atomic percentages near the catalyst layer's outermost surface. Previously, when analyzing the heat treatment effect on membranes, the sulfur and carbon atomic percentages near the membrane's surface were measured in order to calculate the sulfur to carbon ratio. The sulfur to carbon atomic percent ratio was used to determine the relative hydrophobicity/hydrophilicity of the membrane's surface since a higher amount of sulfonate ionic groups leads to a more hydrophilic skin. If the carbon high resolution scan was collected for the surface of the catalyst layer ionomer (CL coated on the microporous layer side of a carbon GDL), then photoelectrons would be inadvertently collected from the carbon GDE substrate. Therefore, for this XPS study, high resolution XPS scans are collected for sulfur and fluorine. Subsequently, the sulfur to fluorine atomic ratio is calculated and used to determine the relative amount of hydrophobicity/hydrophilicity of the Nafion ionomer thin film at the catalyst layer's surface.

Figure 1:
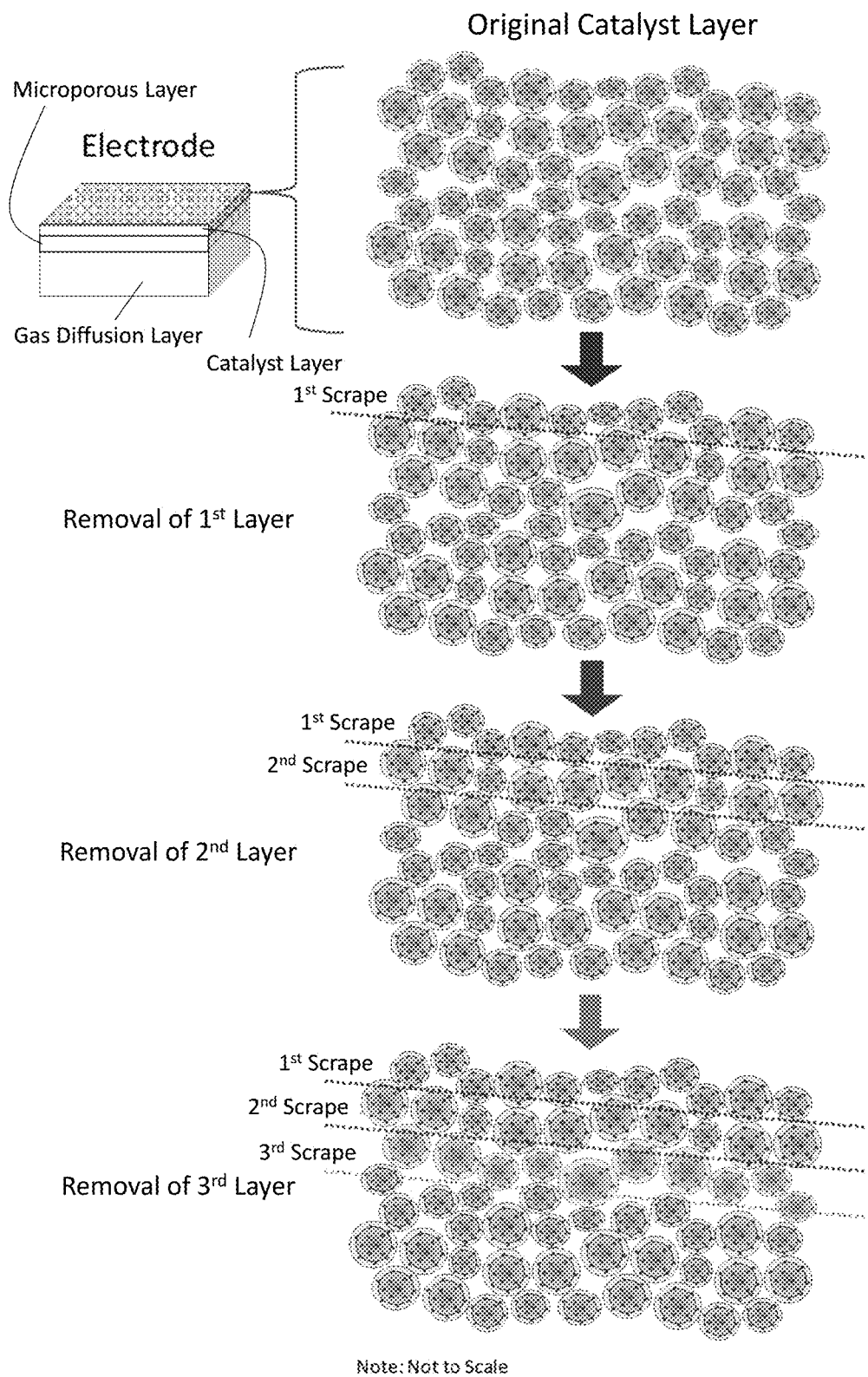
FIG. 1 shows the layer by layer removal process for catalyst layer X-ray photoelectron spectroscopy (XPS) analysis.

Next, the catalyst layer side of the heat treated GDEs were lightly scraped with a razor blade to reveal the Nafion ionomer inside the gas pores of the catalyst layer. If XPS depth profiling (i.e. sputtering using argon ion beam etching) was completed on the surface of the catalyst layer for the heat treated GDE samples, ion beam etching would preferentially remove the ionomer thin film present in the catalyst layer vice having a uniform removal process. [18] It is well-known that even short sputtering times (<2 min) can cause rapid degradation to polymers. [19] Therefore, the scraping process was implemented instead of ion beam etching since etching would lead to a skewed catalyst layer composition. High resolution scans were collected with the XPS to measure the sulfur and fluorine atomic percentages after each successive removal of a fraction of the catalyst layer. A total of three successive scrapes were used to remove a portion of the catalyst layer in order to be able to characterize the ionomer-gas interface inside the gas pores of the catalyst layer. FIG. 1 provides a simplified sketch of how scraping the uppermost surface of the catalyst layer leads to exposure of the ionomer thin film located inside the gas pores of the catalyst layer. After scraping the catalyst layer, XPS was used to characterize the ionomer-gas interface. The ability to characterize the surface and internal ionomer structure for the heat-treated electrodes was important in order to validate that the exposure conditions create a hydrophobic or hydrophilic ionomer-gas interface inside the catalyst layer.

A major purpose of this Example was to incorporate the catalyst layer heat treatment exposure conditions into the membrane electrode assembly (MEA) process and to explore realistic operating conditions in order to maximize fuel cell performance. Therefore, higher temperatures, additional flow field types, and air humidification levels were investigated.

Conventionally, the MEA is made by hot pressing two electrodes onto each side of a polymer electrolyte membrane (PEM) such that the catalyst layer side of the electrodes face the membrane. The conventional MEA hot-pressing setup is shown in FIG. 2A. For this MEA technique, gaskets are placed around each electrode to ensure the electrodes are not crushed during the hot-pressing procedure. The MEA is hot-pressed at 135° C. and 500 kPa for 5 min. [20] In this Example, two new hot-pressing techniques were explored to apply the heat treatment method to the cathode catalyst layer during MEA fabrication. Both new methods recreate the conditions necessary to create a hydrophobic ionomer-gas interface inside the gas pores of the catalyst layer. A hydrophobic ionomer-gas interface in the cathode catalyst layer of a $H_2$-air PEMFC results in improved gas and liquid transport into and out of the catalyst layer, respectively.

First, natural convection was achieved by inserting a porous metal disk (stainless steel 2" diameter, 0.062" thick, 100-micron average pore size) above the cathode. The pores were randomly distributed and interconnected. For the natural convection setup, shown in FIG. 2B, a porous metal disk was placed above the cathode to allow a pathway for steam to escape. During hot pressing, moisture in the PEM flashes to steam and creates a saturated steam environment inside the gas pores of the catalyst layer. By inserting a porous metal disk above the cathode, the steam concentration gradient created between the pores of the catalyst layer and pores of the metal disk enables natural convection of steam out of the catalyst layer to occur. By contrast, for the conventional MEA technique, the PTFE gasket surrounding the electrode prevents steam from escaping. Locked-in steam is ideal for creating a hydrophilic ionomer-gas interface inside the gas pores of the catalyst layer. However, the natural convection setup allows steam to escape radially out through the porous metal disk. Next, forced convection was investigated by inserting an interdigitated carbon flow field face down above the porous metal disk and flowing dry heated argon gas during the MEA fabrication process. The forced convection setup is shown in FIG. 2C. For the forced convection setup, channels were cut into the gasket surrounding the cathode in order to provide a pathway for heated dry argon to flow through the electrode during hot pressing.

For the forced convection setup, flow duration was investigated to determine the effect on fuel cell performance. The following forced convection MEAs were tested to determine an optimal flow duration to provide peak fuel cell performance: 5 min of forced convection during the entire hot-pressing procedure, 3 min no flow followed by 2 min of forced convection, and 4 min no flow followed by 1 min of forced convection. It was found that an initially saturated steam environment of sufficient duration was important to provide adequate time for the ionomer to relax. A steam environment inside the gas pores of the catalyst layer enables the ionomer phase to relax and allows the sulfonate ionic groups within the Nafion ionomer to reorient themselves. Next, as dry heated argon flowed through the gas pores of the catalyst layer and steam was removed, the sulfonate ionic groups reoriented themselves and migrated inward towards any remaining moisture inside the bulk of the ionomer. This leads to a hydrophobic ionomer-gas interface due to an ionomer-gas surface rich in fluorinated-carbon backbone structure and void of sulfonate ionic groups.

For PEMFC testing, discharge polarization curves were collected at various fuel cell temperatures, air humidification conditions, and flow fields (cathode side only) using MEAs prepared with the procedure outlined in the paragraph above. In the first study, the effect of fuel cell temperature on fuel cell performance was explored. The following three temperature schemes were used: (a) Fuel cell: 25° C., $H_2$ humidification bottle: 25° C., Air humidification bottle: 25° C., (b) Fuel cell: 25° C., $H_2$ humidification bottle: 50° C., Air humidification bottle: 25° C., and (c) Fuel cell: 70° C., $H_2$ humidification bottle: 95° C., Air humidification bottle: 70° C.

In the second study, the effect of flow field type (cathode side only) on fuel cell performance was investigated for the various MEA fabrication techniques. Either a serpentine (1 mm channel width, 1 mm channel depth) or interdigitated (1 mm channel width, 1 mm channel depth, 1 mm shoulder width) carbon flow fields with 2.25 $cm^2$ flow area were used to deliver air to the cathode, while an interdigitated flow field delivered hydrogen to the anode. In the third study, the effect of air humidification on fuel cell performance was examined. Air was either humidified by bubbling incoming air through a heated bottle of deionized water, or dry air was delivered directly to the cathode. Table 1 lists the key parameters used for each fuel cell study.

TABLE 1

Experimental design conditions.

| Study # | 1 | 2 | 3 |
|---|---|---|---|
| Experimental Control | Temperature | Flow field type | Air humidification |
| MEA Type | Normal (conventional) MEA<br>Natural Convection MEA | Normal (conventional) MEA<br>Natural Convection MEA | Normal (conventional) MEA<br>Natural Convection MEA<br>Forced Convection MEA |
| Cathode | SGL 25BC GDL coated with Pt/C/Nafion layer (0.50 mg Pt/cm$^2$, 0.14 mg/cm$^2$ Nafion ionomer) | SGL 25BC GDL coated with Pt/C/Nafion layer (0.50 mg Pt/cm$^2$, 0.14 mg/cm$^2$ Nafion ionomer) | SGL 25BC GDL coated with Pt/C/Nafion layer (0.50 mg Pt/cm$^2$, 0.14 mg/cm$^2$ Nafion ionomer) |
| Anode | SGL 25BC GDL coated with Pt/C/Nafion layer (0.50 mg Pt/cm$^2$, 0.14 mg/cm$^2$ Nafion ionomer) | SGL 25BC GDL coated with Pt/C/Nafion layer (0.50 mg Pt/cm$^2$, 0.14 mg/cm$^2$ Nafion ionomer) | SGL 25BC GDL coated with Pt/C/Nafion layer (0.50 mg Pt/cm$^2$, 0.14 mg/cm$^2$ Nafion ionomer) |
| Membrane | NR212 | NR212 | NR212 |
| Flow Fields for Cathode | Serpentine carbon flow field | Serpentine and interdigitated carbon flow fields | Interdigitated carbon flow fields |
| Air Flow Rate | 350 mL/min | 350 mL/min | 350 mL/min |
| Electrolyte Flow Rate | 5 mL/min, 6 mL/min, or 12 mL/min | 12 mL/min | 12 mL/min |
| H$_2$ Flow Rate and Pressure | 660 mL/min & 0.136 MPa | 660 mL/min & 0.136 MPa | 660 mL/min & 0.136 MPa |
| Temperature | 25° C. fuel cell, hydrogen, & air.<br>25° C. fuel cell & air, 50° C. hydrogen<br>70° C. fuel cell & air, 95° C. hydrogen | 25° C. fuel cell, hydrogen, & air.<br>70° C. fuel cell & air, 95° C. hydrogen | 70° C. fuel cell & air, 95° C. hydrogen |
| Humidification | Humidified hydrogen and air | Humidified hydrogen and air | Humidified hydrogen, humidified & dry air |

All fuel cell testing was completed using a hydrogen pressure of 0.136 MPa (5 psig) and flow rate of approximately 660 mL/min (Equivalence of 51.7 A/cm$^2$ at 25° C., 47.7 A/cm$^2$ at 50° C., and 44.9 A/cm$^2$ at 70° C.) by using a recirculation pump. Air was delivered to the cathode at a rate of approximately 350 mL/min (Equivalence of 8.6 A/cm$^2$ at 25° C. and 7.5 A/cm$^2$ at 70° C.) in a flow-through setup. Nafion 212 (~51 μm thick) was used for the polymer electrolyte membrane for all MEAs and electrical current was collected from the edges of the current collectors. Sigracet GDL-25BC carbon electrodes were used as the substrates for both the hydrogen and air electrodes. A catalyst layer (0.5 mg/cm$^2$ Pt geometric area, 0.14 mg/cm$^2$ Nafion ionomer) was spray coated onto the microporous layer side of the GDLs. A start-up procedure consisted of operating each PEMFC at 0.2V until 0.4 A/cm$^2$ was achieved, then holding the discharge current steady at 0.4 A/cm$^2$ for 1 h. [20] Discharge polarization curves were collected by using constant voltage staircases in 50 mV increments from OCV to 0.2 V. Multiple discharge polarization curves were collected for each MEA to ensure repeatable results. EIS was completed at 5 mV amplitude over a frequency range of 1 Hz to 100 kHz on each fuel cell to measure the internal cell resistance. EIS was also completed on the fuel cell fixture without a MEA to measure the electrical resistance of the fuel cell components.

Results and Discussion

Figure 3:
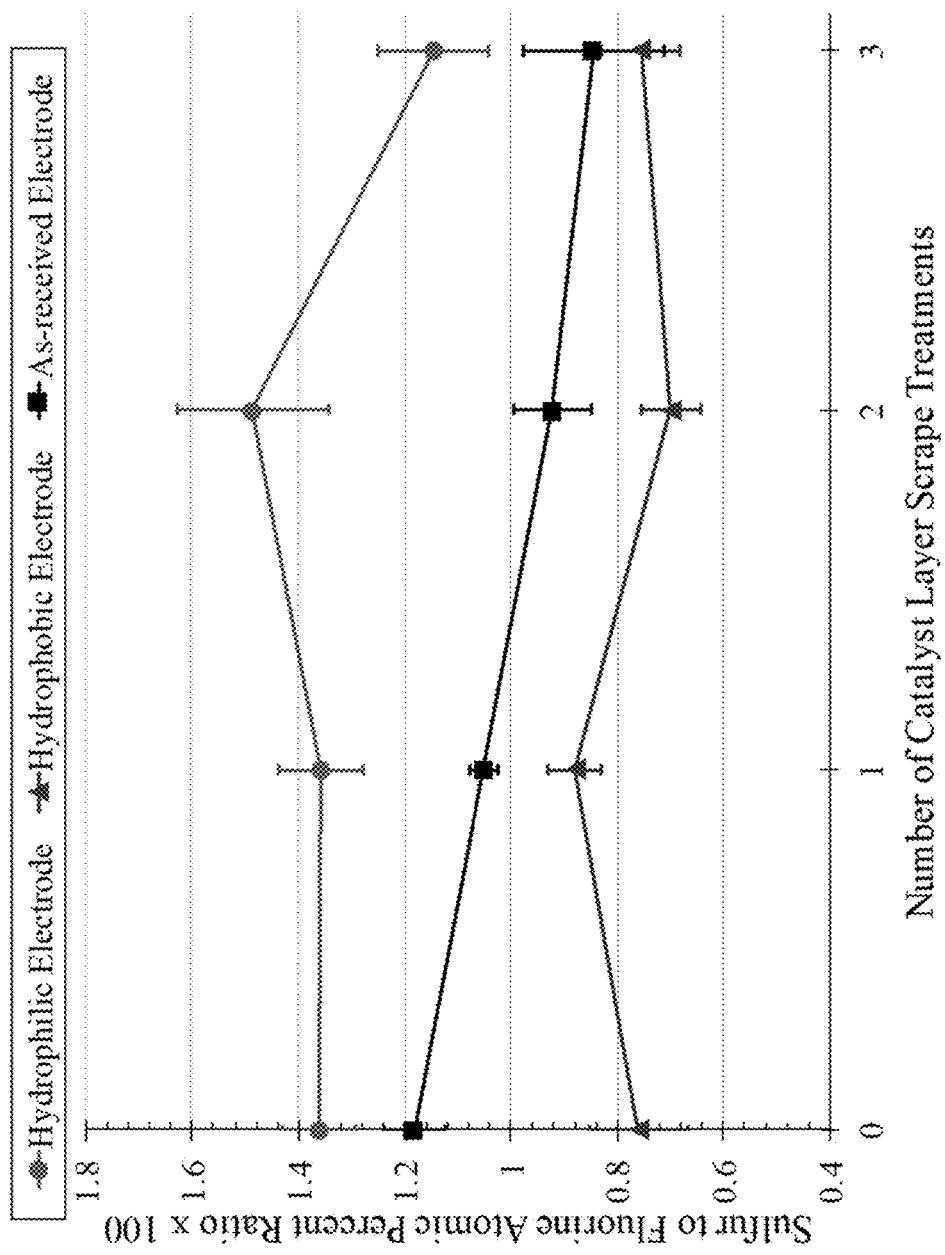
FIG. 3 shows results from the XPS characterization of catalyst layers.

After exposing several catalyst-coated GDEs to various heat treatment conditions, XPS was used to validate that the exposure conditions created a hydrophobic or hydrophilic ionomer-gas interface on the surface and inside the gas pores of the catalyst layer. FIG. 3 graphs the sulfur to fluorine ratio for the hydrophilic-treated, hydrophobic-treated, and as-received GDEs. The sulfur to fluorine ratio at point 0 (far-left points in FIG. 3) corresponds to the outermost surface of the catalyst layer prior to applying the scraping procedure. As expected, the hydrophilic-treated GDE had a high sulfur to fluorine ratio than compared to the as-received and hydrophobic-treated GDEs. After scraping each GDE (to expose the ionomer-gas interface inside the gas pores of the catalyst layer), XPS was used to measure the sulfur to fluorine ratio. The magnitude and trend of the sulfur to fluorine ratio after each successive scrape (to remove a portion of the catalyst layer) continued throughout the catalyst layer for both heat treatment conditions and the as-received GDE. These results show that specific heat treatment conditions can create a hydrophilic or hydrophobic ionomer-gas interface for the thin ionomer film on the surface and inside the catalyst layer.

Figure 4:
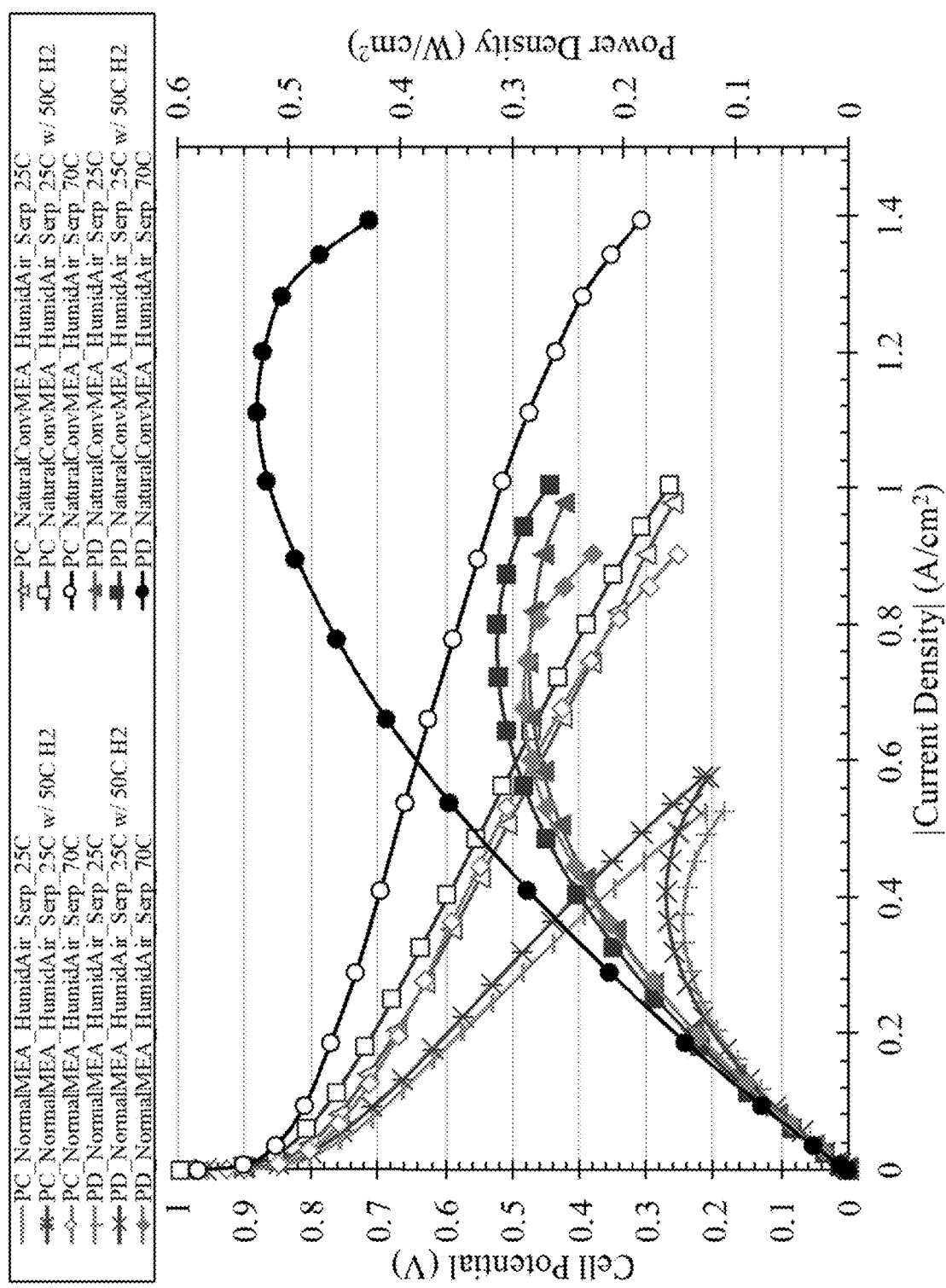
FIG. 4 shows the $H_2$-Air polymer electrolyte membrane fuel cell (PEMFC) discharge polarization and power density curves for normal (conventional) MEA and natural convection MEA at various temperatures using humidified hydrogen, humidified air, and serpentine flow fields.

Next, MEAs were constructed using the normal (i.e. conventional method), natural convection, and forced convection MEA procedures. The MEAs were tested at various temperatures, flow field types (cathode side only), and air humidification conditions. In study 1, various temperatures were used when testing the normal and natural convection MEAs. As shown in FIG. 4, increased temperature resulted in improved fuel cell performance. Comparing the 25° C. base case to the 25° C. with 50° C. humidified hydrogen case, the polarization curve is shifted to the right, indicating the latter testing conditions enabled better hydration of the hydrogen electrode. For the 25° C. with 50° C. humidified hydrogen case, the water vapor in the incoming hydrogen stream condenses onto the surface of the hydrogen electrode due to the cooler temperature of the fuel cell. During discharge, protons produced by the oxidation of hydrogen at the hydrogen electrode drags 4-6 water molecules as they move from the anode to cathode. [21] The electro-osmotic drag process from the anode to cathode can lead to drying out of the hydrogen electrode. The condensation of water vapor at the hydrogen electrode due to heating the hydrogen humidification bottle to 25° C. higher than the fuel cell temperature prevents the hydrogen electrode from drying out during discharge. [22-24] FIG. 4 also shows the benefit of the natural convection MEA over the normal MEA fabrication technique. At 70° C., the peak power density increases by more than 83% from 288 mW/cm$^2$ for the normal MEA to 528 mW/cm$^2$ when implementing the natural convection MEA process.

Figure 5:
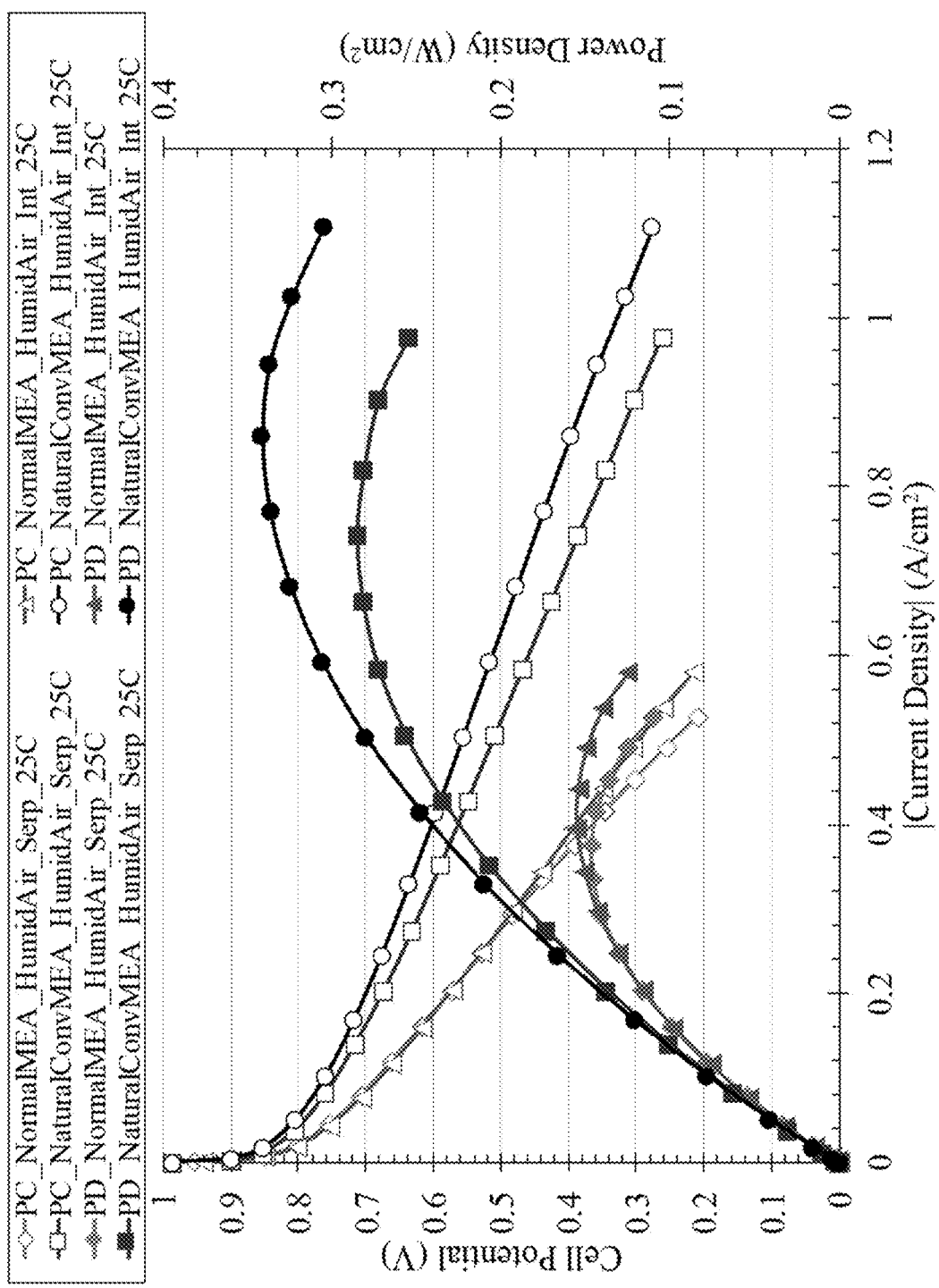
FIG. 5 shows the $H_2$-Air PEMFC discharge polarization and power density curves for normal (conventional) MEA and natural convection MEA at 25° C. using humidified hydrogen, humidified air, and serpentine and interdigitated flow fields.
Figure 6:
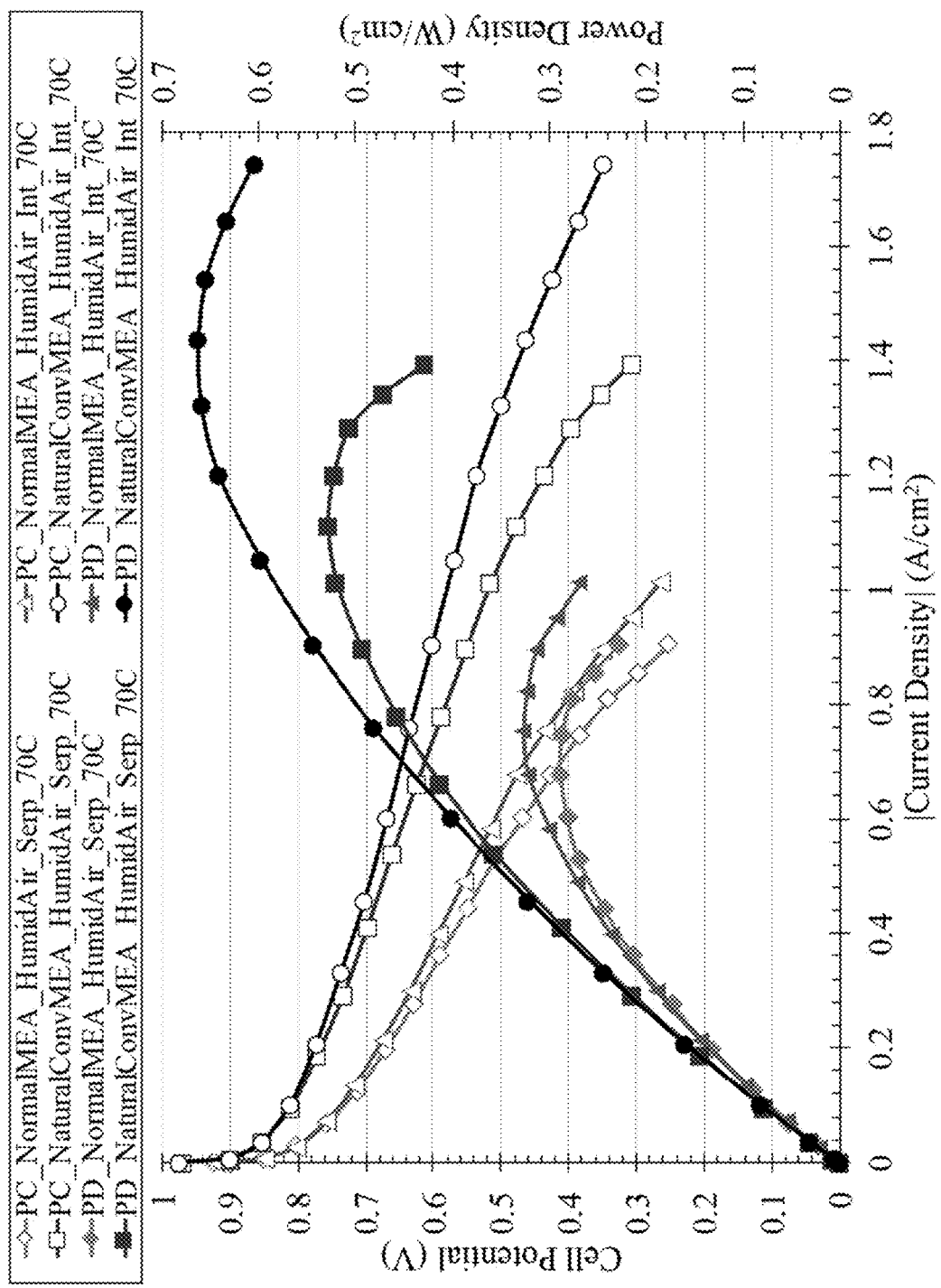
FIG. 6 shows the $H_2$-Air PEMFC discharge polarization and power density curves for normal (conventional) MEA and natural convection MEA at 70° C. using humidified hydrogen, humidified air, and serpentine and interdigitated flow fields.

FIG. 5 compares the polarization and power density curves when using either a serpentine or interdigitated flow field at the cathode. The interdigitated flow field results in improved mass transport during high current density due to increased penetration of oxygen into the electrode and improved removal of liquid water. [1, 22] In FIG. 6, fuel cell temperature is increased from 25° C. (shown in FIG. 5) to 70° C. to determine the effect of flow field type at the cathode during elevated temperatures. At elevated temperatures, the performance enhancement for the natural convection MEA when using an interdigitated vice serpentine flow field at the cathode is greater than at lower temperatures (25% versus 20% improvement). The observed benefit of using an interdigitated flow field on the cathode side is higher at elevated fuel cell temperatures than lower temperatures due to the interdigitated flow field's ability to overcome the mass transport issues related to higher water production (during higher current density operation) in the cathode.

Figure 7:
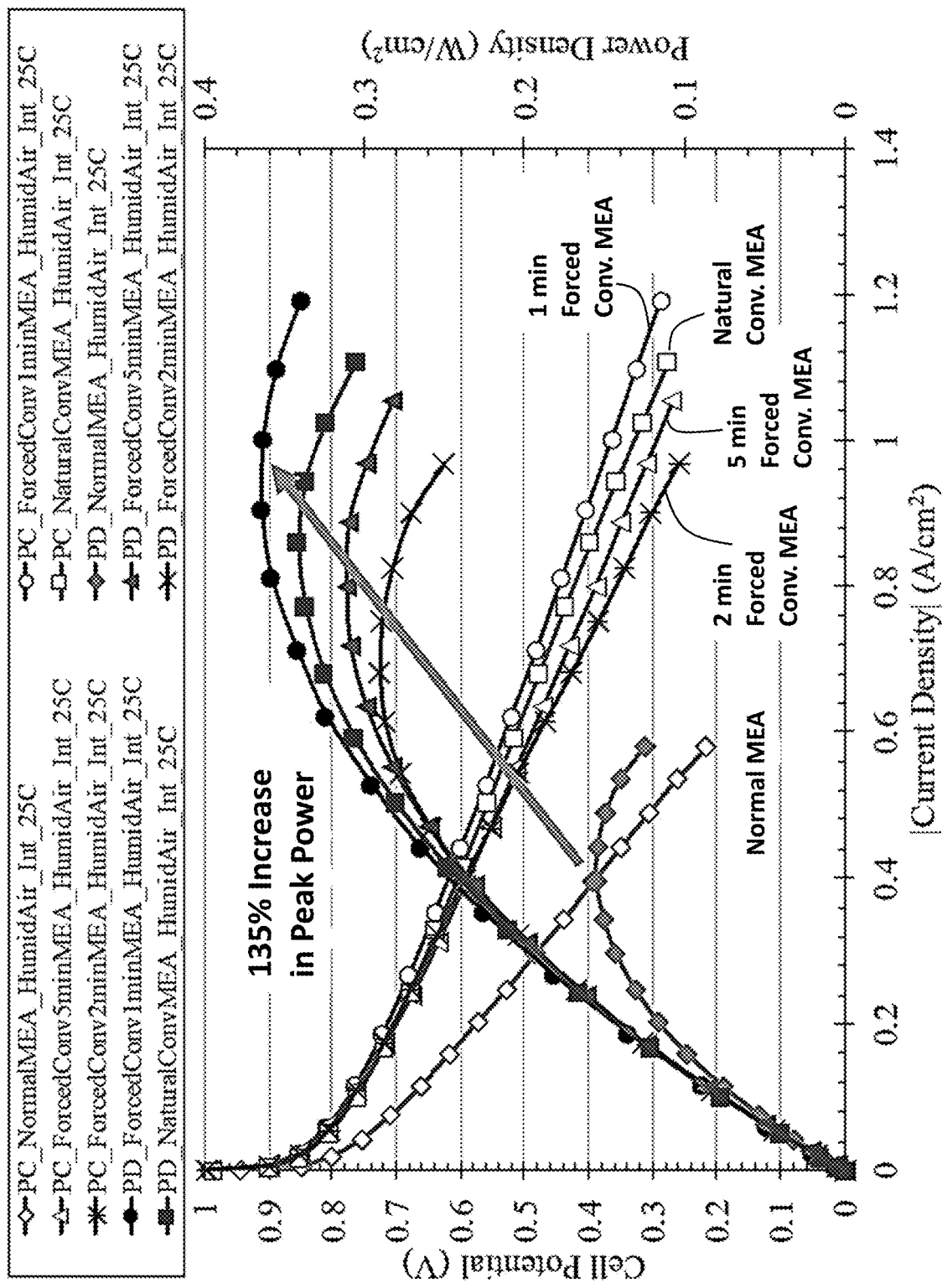
FIG. 7 shows the $H_2$-Air PEMFC discharge polarization and power density curves for normal (conventional) MEA, natural convection MEA, and forced convection MEA at 25° C. using humidified hydrogen, humidified air, and interdigitated flow fields.

Finally, the forced convection MEA method was compared to the normal and natural convection MEA methods. In FIG. 7, each MEA was tested at 25° C. using interdigitated flow fields at both electrodes and humidified air at the cathode. The order of performance (from high to low) for the various MEAs was: 1-min forced convection, natural convection, 2-min forced convection, 5-min forced convection, and normal MEA. The 5-min forced convection MEA underperformed the 1-min and 2-min forced convection MEAs. These results show that sufficient time is needed at saturated steam conditions (above Nafion's glass transition temperature) to allow the ionomer layer to relax and the sulfonate ionic groups to be able to reorient themselves. The natural convection MEA performed remarkably well compared to the forced convection MEAs. This is very encouraging since the natural convection MEA method is simple and easy to apply to a large-scale manufacturing process. The 1 min forced convection MEA method leads to more than a 135% increase in peak power over the normal MEA at 25° C.

Figure 8:
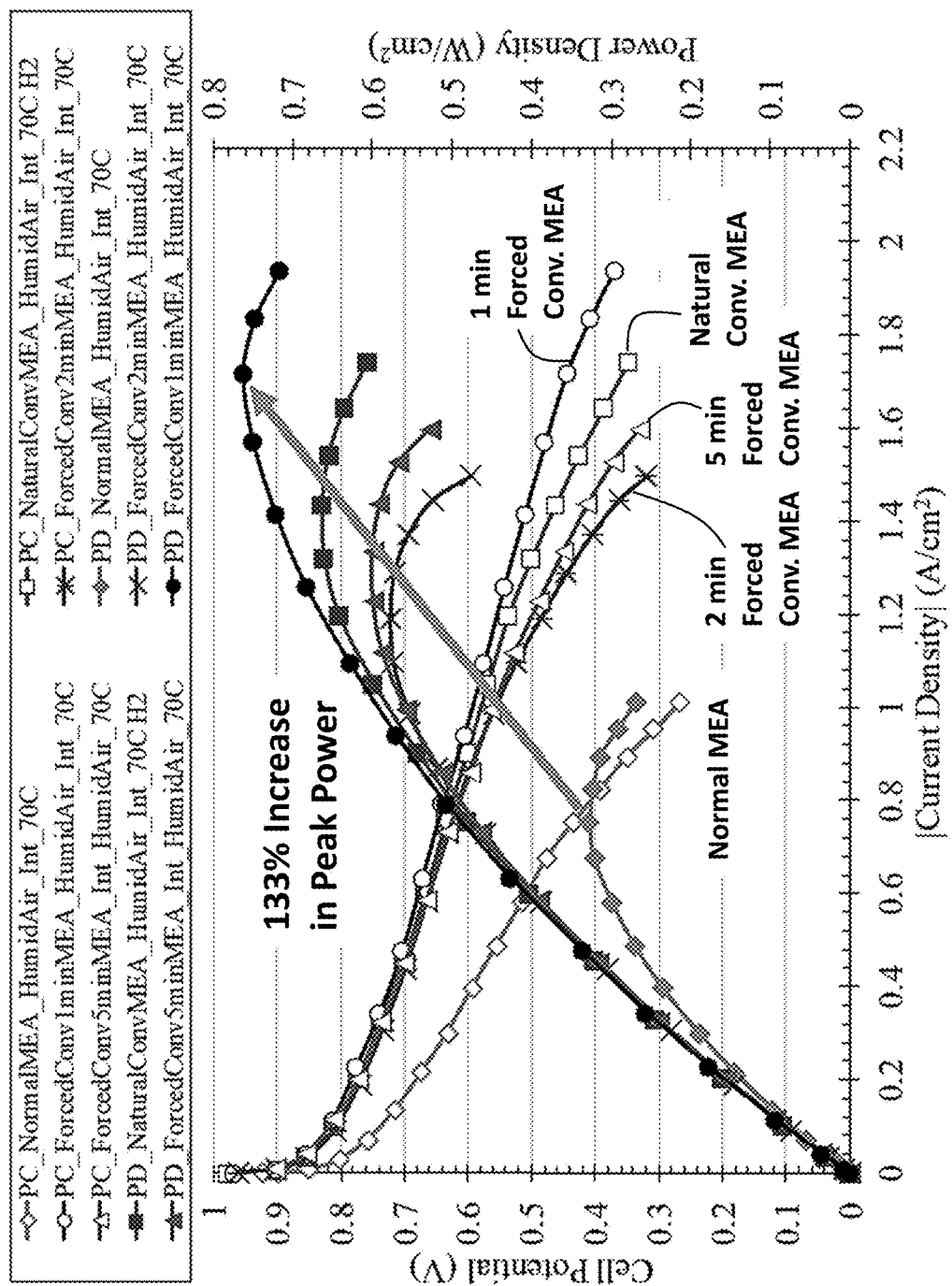
FIG. 8 shows the $H_2$-Air PEMFC discharge polarization and power density curves for normal (conventional) MEA, natural convection MEA, and forced convection MEA at 70° C. using humidified hydrogen, humidified air, and interdigitated flow fields.

In FIG. 8, the forced convection MEA method was compared to the normal and natural convection MEA methods when operating the fuel cell at 70° C. The performance for each MEA method improves over the baseline 25° C. case. The performance enhancement of the 1 min forced convection MEA leads to more than 133% improvement in peak power over the normal MEA method. The order of performance for the various MEAs when operating at 70° C. (i.e. FIG. 8) aligns with the 25° C. baseline case (i.e. FIG. 7).

Figure 9:
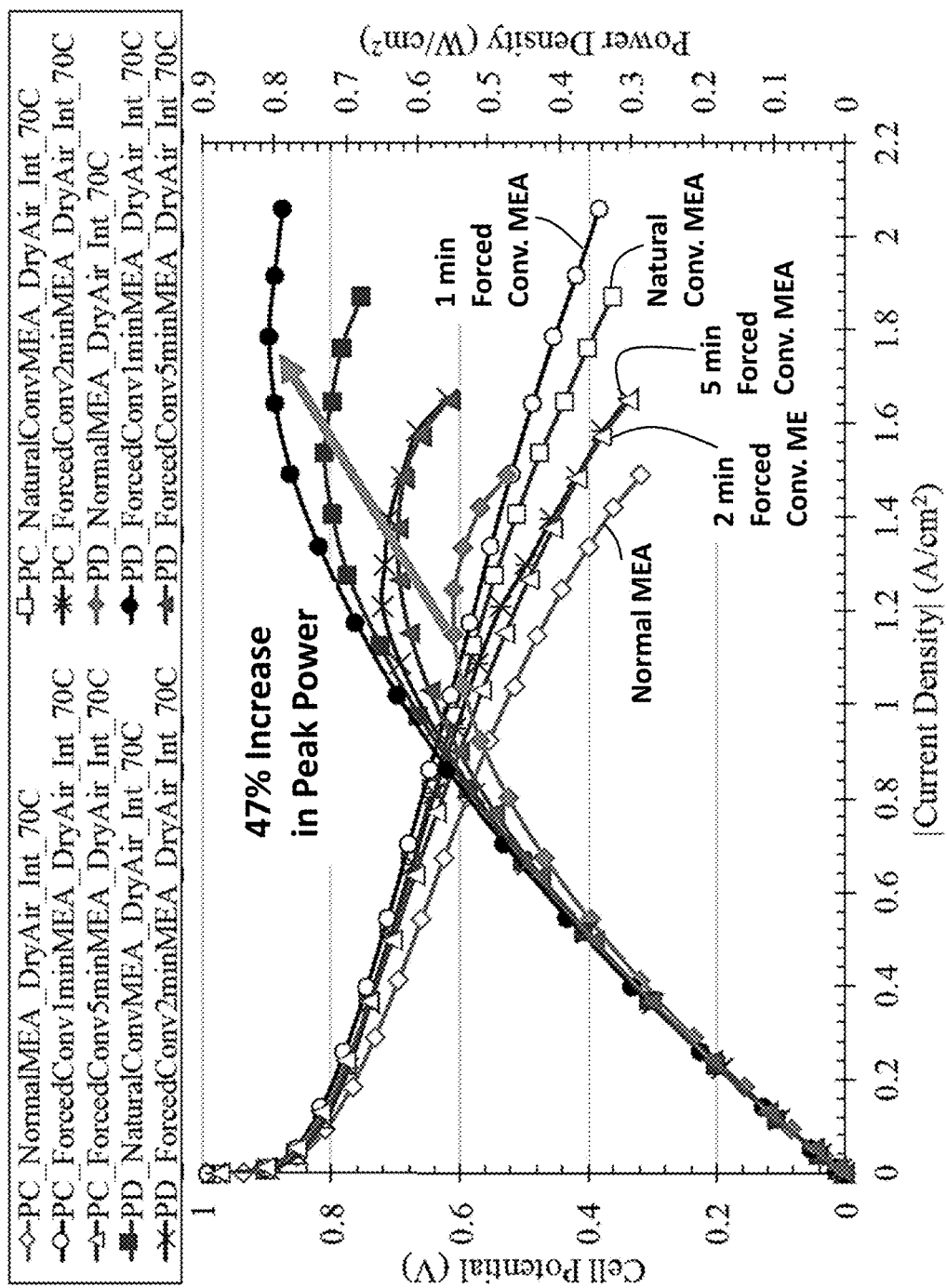
FIG. 9 shows the $H_2$-Air PEMFC discharge polarization and power density curves for normal (conventional) MEA, natural convection MEA, and forced convection MEA at 70° C. using humidified hydrogen, dry air, and interdigitated flow fields.

Lastly, the various MEA fabrication methods were tested using dry air instead of humidified air. It is well known that flowing dry air to the cathode will lead to higher performance due to improved mass transport of oxygen. [21, 22] Dry air is better able to remove liquid water from the cathode, therefore reducing the impact of liquid water buildup and enabling better oxygen transport into the cathode to reach the catalyst reaction sites. As shown in FIG. 9, the normal MEA is able to achieve a current density of more than 1 A/cm$^2$ at 0.5V, which is in alignment with previously published results using state-of-the-art fuel cells. [15, 22, 25-28] To our satisfaction, the 1 min forced convection MEA led to more than a 47% improvement in peak power density over the normal MEA when operating at 70° C. with dry air. The 1 min forced convection MEA performed better than the natural convection MEA, which is in alignment with the observed trend for the humidified air case (i.e. FIG. 8).

The results show that a saturated steam environment is useful at the onset of MEA fabrication in order to allow the catalyst layer ionomer phase sufficient time to relax. This phenomenon resulted in suboptimal performance for the 5-min forced convection method. The 1-min forced convection case led to optimal two-phase flow in the cathode catalyst layer during high current density operations as compared to the other methods.

Summary

In summary, this Example demonstrates a new process for creating a hydrophobic ionomer/gas interface in a fuel cell catalyst layer. After heat treating GDEs, XPS was used to characterize the upper most surface of the catalyst layer. Additionally, a scraping technique was employed to reveal the catalyst layer's internal structure. XPS was used to characterize the ionomer-gas interface inside the gas pores of the catalyst layer after each successive removal of a portion of the catalyst layer.

The heat treatment method was then incorporated into the cathode catalyst layer by using both natural convection and forced convection during the MEA fabrication process. Various fuel cell parameters were studied, including operating temperature, flow field type, and air humidification state. Discharge performance curves for a H$_2$-Air PEMFC using the natural convection and 1 min forced convection MEAs showed remarkable performance compared to the conventionally-prepared MEA. The superior fuel cell performance (47% increase in peak power density at 70° C.) is credited to improved mass transport effect, an increase in the effective proton conductivity in the cathode, or a combination of both phenomena.

A hydrophobic ionomer-gas interface inside the gas pores of the catalyst layer leads to improved mass transport of oxygen into and liquid water out of the cathode (proposed structure shown in FIG. 10). In addition, a hydrophilic ionomer-gas interface will lead to improved performance when flowing liquid electrolyte reactants (i.e. flow battery systems).

REFERENCES

1. T. V. Nguyen, *J. Electrochem. Soc.*, 143, L103 (1996).
2. R. Friedmann and T. V. Nguyen, *J. Electrochem. Soc.*, 157, B260 (2010).
3. M. Uchida, Y. Aoyama, N. Eda and A. Ohta, *J. Electrochem. Soc.*, 142, 4143 (1995).

4. J. Benziger, J. Nehlsen, D. Blackwell, T. Brennan and J. Itescu, *J. Membrane Science,* 261, 98 (2005).
5. T. V. Nguyen, A. Ahosseini, X. Wang, V. Yarlagadda, A. Kwong, A. Z. Weber, P. Deevanhxay, S. Tsushima and S. Hirai, *J. Electrochem. Soc.,* 162, F1451 (2015).
6. R. P. Dowd Jr., T. V. Nguyen, D. S. Moore, P. N. Pintauro and J. W. Park, *ECS Transactions,* 58, 607 (2013).
7. T. V. Nguyen, M. V. Nguyen, G. Lin, N. Rao, X. Xie and D. Zhu, *Electrochemical and Solid-State Letters,* 9, A88 (2006).
8. T. V. Nguyen, M. V. Nguyen, K. J. Nordheden and W. He, *J. Electrochem. Soc.,* 154, A1073 (2007).
9. V. Parry, G. Berthome, J. Joud, O. Lemaire and A. A. Franco, *J. Pwr. Sources,* 196, 2530 (2011).
10. D. K. Paul, K. Karan, A. Docoslis, J. B. Giorgi and J. Pearce, *Macromolecules,* 46, 3461 (2013).
11. N. Zamel, *J. Pwr. Sources,* 309, 141 (2016).
12. F. Zhang, S. G. Advani, A. K. Prasad, M. E. Boggs, S. P. Sullivan and T. P. Beebe Jr, *Electrochimica Acta,* 54, 4025 (2009).
13. Z. Qi and A. Kaufman, *J. Pwr. Sources,* 109, 38 (2002).
14. E. Antolini, L. Giorgi, A. Pozio and E. Passalacqua, *J. Pwr. Sources,* 77, 136 (1999).
15. F. Mack, M. Klages, J. Scholta, L. Jorissen, T. Morawietz, R. Hiesgen, D. Kramer and R. Zeis, *J. Pwr. Sources,* 255, 431 (2014).
16. R. P. Dowd Jr., C. S. Day and T. V. Nguyen, *J. Electrochem. Soc.,* 164, F138 (2017).
17. A. Serizawa, Z. Feng and Z. Kawara, *Experimental Thermal and Fluid Science,* 26, 703 (2002).
18. J. L. Sullivan, Z. Wronski, S. O. Saied and J. Sielanko, *Vacuum,* 46, 1333 (1995).
19. P. Gazdzicki, I. Biswas and M. Schulze, *Surface and Interface Analysis,* 46, 350 (2014).
20. G. Lin and T. V. Nguyen, *J. Electrochem. Soc.,* 152, A1942 (2005).
21. S. Srinivasan, E. A. Ticianelli, C. R. Derouin and A. Redondo, *J. Pwr. Sources,* 22, 359 (1988).
22. D. L. Wood III, J. S. Yi and T. V. Nguyen, *Electrochimica Acta,* 43, 3795 (1998).
23. R. Kuhn, Ph. Kruger, S. Kleinau, M. Dawson, J. Geyer, M. Roscher, I. Manke and Ch. Hartnig, *International Journal of Hydrogen Energy,* 37, 7702 (2012).
24. W. Yan, C. Chen, S. Mei, C. Soong and F. Chen, *J. Pwr. Sources,* 162, 1157 (2006).
25. N. J. Cooper, T. Smith, A. D. Santamaria and J. W. Park, *International Journal of Hydrogen Energy,* 41, 1213 (2016).
26. G. S. Avcioglu, B. Ficicilar, A. Bayrakceken and I. Eroglu, *International Journal of Hydrogen Energy,* 40, 7720 (2015).
27. X. Wang and T. V. Nguyen, *J. Pwr. Sources,* 197, 50 (2012).
28. T. V. Nguyen and M. W. Knobbe, *J. Pwr. Sources,* 114, 70 (2003).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of forming a membrane electrode assembly, the method comprising:
   pressing a stack comprising
      a cathode comprising a gas diffusion layer, the gas diffusion layer comprising an electrically conductive material, and a microporous layer adjacent to the gas diffusion layer,
      an anode,
      a proton exchange membrane between the cathode and the anode,
      a porous catalyst layer in contact with the proton exchange membrane and in contact with the cathode, the porous catalyst layer comprising an ionomer, the ionomer coating internal surfaces of pores of the porous catalyst layer, thereby providing internal ionomer-gas interfaces within the porous catalyst layer, and
      a porous metal plate in contact with the cathode, the porous metal plate comprising pores in fluid communication with pores of the porous catalyst layer;
      for a time, a pressure, and a temperature to bind the ionomer to the proton exchange membrane, whereby steam is generated within the porous catalyst layer;
   removing the steam via pores of the porous catalyst layer to increase the hydrophobicity of the internal ionomer-gas interfaces within the porous catalyst layer;
   further removing steam from the stack via pores of the porous metal plate while pressing the stack; and
   further comprising flowing a gas through the pores of the porous catalyst layer during the pressing step, wherein the stack further comprises a gasket on a portion of the proton exchange membrane, wherein the gasket is configured to provide a pathway for the gas to flow out of the stack during pressing, and further wherein the pathway is through a side of the gasket such that the flow of the gas out of the stack is in a direction parallel to a plane defined by the proton exchange membrane.

2. The method of claim 1, wherein the ionomer is a sulfonated tetrafluoroethylene based fluoropolymer-copolymer comprising sulfonate ionic groups.

3. The method of claim 2, wherein the internal ionomer-gas interfaces are characterized by a sulfur-to-fluorine atomic percent ratio of no greater than 0.9.

4. The method of claim 2, wherein the internal ionomer-gas interfaces are characterized by a sulfur-to-fluorine atomic percent ratio of no greater than 0.8.

5. The method of claim 1, wherein the gas is dry, inert and heated.

6. The method of claim 1, wherein the gas is flowed after a predetermined delay period.

7. The method of claim 6, wherein the predetermined delay period is at least 65% of the pressing time.

8. The method of claim 6, wherein the predetermined delay period is at least 75% of the pressing time.

9. A method of forming a membrane electrode assembly, the method comprising:
pressing a stack comprising
a cathode comprising a gas diffusion layer, the gas diffusion layer comprising an electrically conductive material, and a microporous layer adjacent to the gas diffusion layer,
an anode,
a proton exchange membrane between the cathode and the anode,
a porous catalyst layer in contact with the proton exchange membrane and in contact with the cathode, the porous catalyst layer comprising an ionomer, the ionomer coating internal surfaces of pores of the porous catalyst layer, thereby providing internal ionomer-gas interfaces within the porous catalyst layer, and
a porous metal plate in contact with the cathode, the porous metal plate comprising pores in fluid communication with pores of the porous catalyst layer;
for a time, a pressure, and a temperature to bind the ionomer to the proton exchange membrane, whereby steam is generated within the porous catalyst layer;
removing the steam via pores of the porous catalyst layer to increase the hydrophobicity of the internal ionomer-gas interfaces within the porous catalyst layer;
further removing steam from the stack via pores of the porous metal plate while pressing the stack; and
further comprising flowing a gas through the pores of the porous catalyst layer during the pressing step, wherein the gas is delivered via a flow field plate in fluid communication with the pores of the porous catalyst layer.

10. The method of claim 9, wherein the flow field plate is configured as a dead-ended flow field to force the gas to flow downwardly into the pores of the porous catalyst layer.

11. The method of claim 1, wherein the membrane electrode assembly, in a polymer electrolyte membrane fuel cell comprising the membrane electrode assembly, a first flow field in fluid communication with the cathode configured to deliver oxygen to the cathode, and a second flow field in fluid communication with the anode configured to deliver hydrogen to the anode, provides a peak power density that is at least 130% greater than that of a comparative polymer electrolyte membrane fuel cell, the peak power density measured at 25° C. using humidified hydrogen, humidified air and interdigitated flow fields.

12. A method of forming a membrane electrode assembly, the method comprising:
pressing a stack comprising
a cathode comprising a gas diffusion layer, the gas diffusion layer comprising an electrically conductive material, and a microporous layer adjacent to the gas diffusion layer,
an anode,
a proton exchange membrane between the cathode and the anode,
a porous catalyst layer in contact with the proton exchange membrane and in contact with the cathode, the porous catalyst layer comprising an ionomer, the ionomer coating internal surfaces of pores of the porous catalyst layer, thereby providing internal ionomer-gas interfaces within the porous catalyst layer, and
a porous metal plate in contact with the cathode, the porous metal plate comprising pores in fluid communication with pores of the porous catalyst layer;
for a time, a pressure, and a temperature to bind the ionomer to the proton exchange membrane, whereby steam is generated within the porous catalyst layer;
removing the steam via pores of the porous catalyst layer to increase the hydrophobicity of the internal ionomer-gas interfaces within the porous catalyst layer;
further removing steam from the stack via pores of the porous metal plate while pressing the stack, wherein the porous catalyst layer is between the cathode and the proton exchange membrane and the stack further comprises an additional porous catalyst layer in contact with the proton exchange membrane and between the anode and the proton exchange membrane, the additional porous catalyst layer comprising an ionomer, the ionomer coating internal surfaces of pores of the additional porous catalyst layer, thereby providing internal ionomer-gas interfaces within the additional porous catalyst layer;
further comprising removing additional steam via pores of the additional porous catalyst layer to increase the hydrophobicity of the internal ionomer-gas interfaces within the additional porous catalyst layer; and
further comprising flowing a dry, inert and heated gas through the pores of the additional porous catalyst layer during the pressing step.

13. The method of claim 12, wherein the method provides the porous catalyst layer with a degree of hydrophobicity which is greater than that of the additional porous catalyst layer.

* * * * *